United States Patent [19]
Vitous

[11] 3,952,642
[45] Apr. 27, 1976

[54] LIQUID DISTRIBUTOR

[75] Inventor: Charles J. Vitous, Berwyn, Ill.

[73] Assignee: Cory Food Services, Inc., Chicago, Ill.

[22] Filed: Nov. 4, 1974

[21] Appl. No.: 521,367

[52] U.S. Cl. .................................. 99/300; 99/315
[51] Int. Cl.² .......................................... A47J 31/00
[58] Field of Search ............ 99/304, 295, 298, 300, 99/302, 315–316; 169/37; 239/498, 523, 524, 109, 570

[56] References Cited
UNITED STATES PATENTS

| | | | |
|---|---|---|---|
| 481,769 | 8/1892 | Randall | 99/312 |
| 1,036,767 | 8/1912 | Wojidkow | 99/312 |
| 1,183,721 | 5/1916 | Bowman | 99/312 |
| 2,882,811 | 4/1959 | Kass | 99/312 |
| 3,490,356 | 1/1970 | Peterson et al. | 99/300 |
| 3,626,839 | 12/1971 | Martin et al. | 99/315 |

Primary Examiner—Stanley N. Gilreath
Assistant Examiner—Arthur O. Henderson
Attorney, Agent, or Firm—Wegner, Stellman, McCord, Wiles & Wood

[57] ABSTRACT

A distributor for absorbing kinetic energy from a downwardly directed liquid stream and guiding the liquid stream therefrom in a distributed plurality of divergent paths to a subjacent receiver. The distributor is defined by a central transverse wall against which the liquid stream is impinged to absorb kinetic energy therefrom. An annular portion extends laterally outwardly from the periphery of the transverse wall and is provided with a plurality of upwardly opening grooves for guiding the liquid in a plurality of divergent streams from the transverse wall to the subjacent receiver. The annular portion may be a frustoconical wall and may include lands between the respective grooves. The distributor includes a mounting portion adapted to be connected in fluid conducting relationship to the end of a liquid supply conduit and includes structure for spacing the transverse wall a preselected distance from the outlet of the conduit.

15 Claims, 5 Drawing Figures

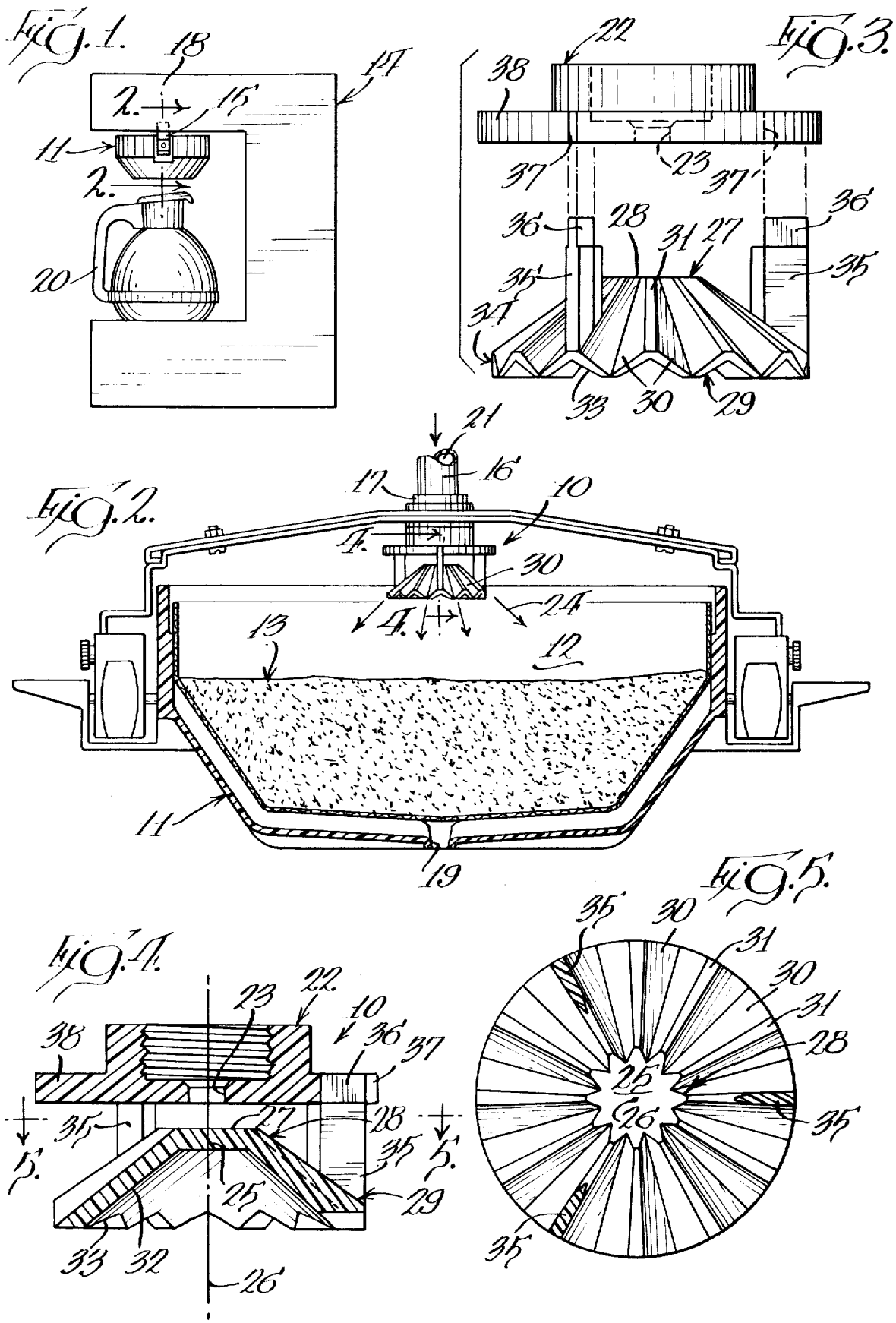

LIQUID DISTRIBUTOR

BACKGROUND OF THE INVENTION

1. Field of the Invention

This invention relates to fluid flow control devices and in particular to fluid flow deflectors.

2. Description of the Prior Art

In controlling the delivery of fluids, such as hot water, to charges of beverage brewing ingredients in coffee brewers and the like, it is desirable to distribute the hot water generally uniformly to the brewing charge. It has been conventional in devices such as coffee percolators to direct the stream of hot water from the percolator stem onto a frusto-conical deflector having a plurality of divergent upwardly opening grooves whereby the hot water is delivered in a plurality of divergent streams onto the subjacent coffee grounds. One such deflector device is shown in the Wojidkow U.S. Pat. No. 1,036,767. As shown therein, the hot water is pumped by a percolator action upwardly through the hollow stem onto the annular deflector over which it flows in the form of a plurality of separate streams onto the coffee grounds carried in the lower portion of the brewing chamber.

In L. M. Bowman U.S. Pat. No. 1,183,721, a deflector is provided having a frustoconical portion defining a plurality of outwardly widening, upwardly opening divergent grooves. The deflector includes a mounting portion adapted to be mounted to the delivery conduit defined by the percolator stem. A baffle wall is provided on the annular deflector in alignment with the outlet of the delivery conduit whereby hot water delivered therefrom may impinge on the baffle and fall therefrom onto the subjacent frustoconical deflector to be guided by the grooves in the desired plurality of distributed streams.

In U.S. Pat. No. 2,882,811 of Samuel M. Kass, a deflector is provided having a mushroom shape defined by an annular rounded wall having a plurality of rounded grooves and adapted to be carried on the upper portion of the percolator stem.

The control of liquid flow in liquid distributing devices may be effected by rounded grooves as shown in the above discussed prior art patents, or interchangeably by flat sided grooves such as illustrated in U.S. Pat. Nos. 3,013,729 of Edward S. McLean; 2,727,784 of George E. Hansen; 2,222,465 of Gunnar B. Nystrom; and 2,423,960 of Ernest H. Bucknell, et al.

A substantially different appraoch to the distribution of the hot water onto the coffee grounds is illustrated in the more recent United States Letters Patent of Le Roy Peterson et al U.S. Pat. No. 3,490,356. In this patent, the stream of liquid from the delivery conduit is deflected by a plurality of elongated elements intersecting at a mid-portion of the device with the intersection of the elements being disposed in the path of the delivered stream so as to deflect the stream into a plurality of divergent paths. In the Peterson et al patent, the annular deflector is eliminated and the deflected streams are permitted to flow directly downwardly from the intersection of the elongated elements at a deflection angle controlled substantially by the velocity of the supply stream. Thus, rather than provide a flat baffle, such as in the Bowman patent, for absorbing kinetic energy and deflecting the delivered stread onto a circumjacent annular apron, Peterson et al suggest providing a pointed deflector into the center of the stream.

The concept of providing intersecting elongated element, or ribs, at the center of an impinging liquid stream is shown in the earlier Bucknell et al patent discussed above wherein the divergent ribs intersect to define downwardly angled surfaces therebetween tapering toward the vertical axis of the device. As pointed out in Bucknell et al, this type of distributor splits the stream in diverting the water flow and the delivery of the water therefrom is dependent upon the velocity and pressure of the supply stream.

John R. Thorson U.S. Pat. No. 3,178,119 shows the use of a spray head having a tapered center and an annular apron provided with upwardly opening radial slots which apparently extend fully through the thickness of the disc such that the deflector is effectively defined by a plurality of radially extending fingers or ribs. Thus, similarly as in the Peterson et al patent, the impinging stream is deflected by the pointed center element to pass downwardly through the radially extending spaces between the ribs with the angle of deflection being controlled primarily by the water pressure and angular configuration of the pointed center element. In addition, Thorson provides lands between the slots for further deflecting the downwardly directed stream.

SUMMARY OF THE INVENTION

The present invention comprehends an improved distributor for guiding a liquid stream in a distributed plurality of divergent paths utilizing a flat baffle in the path of the delivered fluid stream to absorb kinetic energy from the stream and permit the fluid to fall laterally from the baffle onto an annular deflector having a plurality of elongated grooves whereby the fluid is guided into a plurality of divergent paths to pass therefrom to a subjacent receiver.

The grooves widen outwardly and open upwardly, extending from the periphery of the flat transverse wall portion. The flat wall portion has an area substantially greater than that of the cross section of the liquid stream directed thereagainst so as to assure absorption of substantialy kinetic energy in the baffling action effected thereby whereby control of the delivery of the fluid in the distributed streams may be effected substantially by the length and angular arrangement of the fluid guiding grooves.

In the illustrated embodiment, flat lands may be provided between the respective grooves. Further, the grooves are arranged to avoid intersection therebetween and more specifically, are tapered inwardly to converge at the vertical centerline of the flat wall portion. The centerline is accurately maintained at the center of the impinging stream of fluid by means of a mounting portion supporting the device to the end of the fluid supply conduit with the flat transverse wall portion being spaced a preselected distance therefrom.

In the illustrated embodiment, the flat transverse wall is formed integrally with the frustoconical deflecting portion and may be formed as a one-piece molded plastic element. Further, the plastic element may include spacer legs upstanding from the periphery of the frustoconical portion and joined to the connecting portion of the device adapted to be connected to the end of the fluid supply conduit.

Thus, the present invention comprehends an improvement over the prior art devices such as shown in the Bowman patent discussed above in providing an improved flat transverse wall contiguous with the inner ends of the distributing grooves of the annular deflector portion providing an improved control of the fluid delivery in a plurality of radially outwardly divergent streams whereby the directing of the streams may be controlled substantially by the configuration of the guiding grooves while yet the fluid stream may be directed forcefully downwardly against the flat central portion of the distributor.

BRIEF DESCRIPTION OF THE DRAWING

Other features and advantages of the invention will be apparent from the following description taken in conjunction with the accompanying drawing wherein:

FIG. 1 is a side elevation of a coffee brewing apparatus having a brewing liquid distributor embodying the invention;

FIG. 2 is an enlarged vertical section taken substantially along the line 2—2 of FIG. 1;

FIG. 3 is an exploded side elevation of the distributor;

FIG. 4 is an enlarged vertical section taken substantially along the line 4—4 of FIG. 2; and FIG. 5 is a horizontal section taken substantially along the line 5—5 of FIG. 4.

DESCRIPTION OF THE PREFERRED EMBODIMENT

In the exemplary embodiment of the invention as disclosed in the drawing, a distributor generally designated 10 is provided for absorbing kinetic energy from a downwardly directed liquid stream and guiding the liquid therefrom in a distributed plurality of divergent paths to a subjacent receiver. In the illustrated embodiment, the receiver comprises a brewing cartridge generally designated 11 defining a brewing chamber 12 in which a charge 13 of coffee grounds may be placed. The cartridge is adapted to be mounted to a brewing apparatus generally designated 14 by a suitable hanger 15.

Apparatus 14 includes means (not shown) for delivering hot brewing water through a delivery conduit 16 having a discharge end 17 opening downwardly from an upper portion 18 of the apparatus. The hot water delivered from conduit 16 is distributed onto the coffee grounds 13 by distributor 10 to form brewed coffee liquid which is subsequently passed downwardly through an outlet 18 at the bottom of the cartridge and into a subjacent decanter 20 for subsequent conventional serving of the coffee.

Delivery conduit discharge portion 17 may define a male threaded element having a central bore 21. Distributor 10, as shown in FIG. 4, includes a connector portion 22 defining a threaded female portion adapted to be readily connected to the outlet 17 and having a delivery passage 23 for conducting the delivered hot water downwardly therethrough.

The present invention, as indicated briefly above, is concerned with the distribution of the hot water stream delivered from the supply conduit in a plurality of divergent paths onto the coffee grounds so as to provide a thorough uniform wetting of the coffee grounds for optimum brewing of the coffee by the hot brewing water. To this end, distributor 10 defines improved means for absorbing kinetic energy from the downwardly directed hot water stream prior to the deflection thereof into the desired preselected divergent paths illustrated by the arrows 24 in FIG. 2. The energy-absorbing means herein comprises a flat transverse baffle wall 25 defining a central axis 26. As shown in FIG. 4, flat baffle wall 25 is spaced below the outlet passage 23 of connector portion 22 in coaxial centered relationship thereto with the flatwise extent of the upper surface 27 of the baffle wall extending accurately perpendicular to the axis 26.

After impinging on the flat baffle surface 27, the delivered hot water falls downwardly over the periphery 28 thereof onto an annular apron 29 which, in the illustrated embodiment, comprises a frustoconical wall formed integrally with the flat baffle wall 27. Frustoconical wall 29 is provided with a plurality of outwardly widening, outwardly opening grooves 30 defining elongated channels for guiding the falling hot water angularly downwardly into distributed paths 24 onto the subjacent coffee grounds 13, as illustrated in FIG. 2. As shown in FIGS. 3 and 5, the grooves 30 may be spaced angularly apart by flat lands 31 which similarly terminate in the periphery 28 of the flat wall portion surface 27.

As shown in FIG. 5, each of the grooves tapers radially inwardly toward a point coincident with the vertical axis 26 whereby intersection of the grooves is effectively eliminated with the grooves being spaced along their entire lengths by the intervening lands 31. For simplified manufacture, the grooves may comprise flat walled grooves, although as will be obvious to those skilled in the art, rounded grooves may be utilized interchangeably as desired in conformity with the different shaped grooves of the prior art discussed above.

Each of the grooves 30 is of equal length and as the baffle wall 25 is centered relative to the impinging stream, water delivered in each of the different paths 24 is effectively conducted outwardly in similar paths. As shown in FIG. 4, the undersurface 32 of the frustoconical portion 29 may be frustoconical. The undersurface may be provided with notches 22 underlying the lands 31 and the groove surfaces downwardly angled therefrom to define a generally fluted peripheral edge generally designated 34 of the distributor, as best seen in FIGS. 2 and 3.

The walls 25 and 29 may be integrally formed as a molded plastic element. Upstanding legs 35 may also be integrally formed with wall 29 to mount the wall element 25,29 in preselected spaced relationship to the connector portion 22. Thus, the upper end 36 of each leg is secured in suitable slots 37 in an annular collar 38 of the connecting portion 22, as illustrated in FIGS. 3 and 4. Illustratively, the leg portions 36 may be ultrasonically welded to the connector portion 38 in the slots 37 to effect the desired secured association. Resultingly, as shown in FIG. 4, transverse wall surface 27 is spaced a preselected distance below the outlet 23 of connector portion 22 in accurate centered relationship thereto for uniform distribution of the delivered hot water onto frustoconical portion 29 and flow along the grooves thereof into the desired paths 24, as discussed above. Connector 22 may be formed of any suitable material, such as molded plastic, and thus, the entire distributor comprises a low cost, unitary device which may be readily installed and replaced relative to the brewing apparatus while yet providing an improved distributed delivery of the brewing water to the brewing charge in the brewing chamber 12.

The foregoing disclosure of specific embodiments is illustrative of the broad inventive concepts comprehended by the invention.

I claim:

1. A liquid distributor for absorbing kinetic energy from a downwardly directed liquid stream and guiding the liquid therefrom in a distributed plurality of divergent paths to a subjacent receiver, said distributor comprising: wall means defining a flat surface having a center portion; a frustoconical element extending laterally outwardly from said wall means defining a plurality of divergent channels; and means for supporting the wall means and frustoconical element with said center portion of said flat surface in transversely extending centered relation to a downwardly directed liquid stream for absorbing kinetic energy therefrom, said flat surface having a lateral extent substantially greater than the cross section of the liquid stream, said supporting means being disposed intermediate said channels whereby said channels may guide liquid falling from the periphery of said flat wall surface into a distributed plurality of paths substantially without interference by said support means.

2. The liquid distributor of claim 1 wherein said channels are spaced apart by flat lands having a width substantially less than that of said channels.

3. The liquid distributor of claim 1 wherein said flat surface defines a serrate periphery.

4. The liquid distributor of claim 1 wherein said channels are of equal length and said flat surface has a maximum transverse extent substantially equal to the length of said channels.

5. The liquid distributor of claim 1 wherein said frustoconical element defines a fluted upper surface.

6. The liquid distributor of claim 1 wherein said frustoconical element defines a plurality of V-shaped grooves tapering into the periphery of said wall means flat surface with nonintersecting lands therebetween.

7. The liquid distributor of claim 1 wherein said frustoconical element defines a plurality of V-shaped grooves tapering into the periphery of said wall means flat surface with nonintersecting lands therebetween, each land being defined by a central flat portion and downwardly angled opposite side portions.

8. The liquid distributor of claim 1 wherein said frustoconical element defines a plurality of nonintersecting, radially tapered, generally V-shaped land surface terminating radially inwardly in the periphery of said wall means flat surface.

9. The liquid distributor of claim 1 wherein said supporting means comprises a flat top wall and means permanently secured thereto extending downwardly from the periphery of the top wall into engagement with the upper surface of the frustoconical element.

10. The liquid distributor of claim 1 wherein said supporting means is welded to said frustoconical element.

11. The liquid distributor of claim 1 wherein each said channel is defined by a narrow inner end opening into the periphery of said wall means surface and a wide outer end, the inner end of said channels being substantially wider than the inner end of said lands.

12. A liquid distributor for absorbing kinetic energy from a downwardly directed liquid stream and draining the liquid therefrom in a distributed plurality of divergent paths to a subjacent receiver, said distributor comprising:

first wall means defining an upper flat central surface;

annular means extending laterally outwardly from said wall means defining a plurality of divergent channels each having an inner end opening into the periphery of said flat surface and a wide outer end; and support means for supporting the wall means with said central surface in transversely extending centered relation to a downwardly directed liquid stream for absorbing kinetic energy therefrom, said support means including a second wall means defining a flat downwardly facing flat surface having a transverse extend substantially greater than that of said first wall means flat surface and provided with a central opening for passing said liquid stream downwardly therethrough.

13. The liquid distributor of claim 12 wherein said central opening has a transverse extent substantially smaller than that of said first wall means flat surface.

14. The liquid distributor of claim 12 wherein said second wall means has a peripheral extent substantially equal to that of said annular means.

15. The liquid distributor of claim 12 wherein said second wall means defines a threaded connector coaxially of said central opening.

* * * * *